United States Patent [19]

DeRosa et al.

[11] Patent Number: 5,141,661
[45] Date of Patent: Aug. 25, 1992

[54] WEAR RESISTANT LUBRICANT ADDITIVES MADE OF ETHYLENE/α-OLEFIN POLYMER GRAFTED WITH PERFLUORO-SUBSTITUENTS

[75] Inventors: Thomas F. DeRosa, Passaic, N.J.; Benjamin J. Kaufman, Hopewell Junction, N.Y.; Rosemary J. Jennejahn, Nelsonville, N.Y.; Joseph M. Russo, Poughkeepsie, N.Y.

[73] Assignee: Texaco Inc., White Plains, N.Y.

[21] Appl. No.: 753,591

[22] Filed: Sep. 3, 1991

[51] Int. Cl.⁵ .............. C10M 147/04; C08F 8/18
[52] U.S. Cl. .................. 252/54.6; 252/48.4; 252/49.9; 252/54; 252/58; 525/332.3; 525/340; 525/343; 525/355
[58] Field of Search .............. 252/54, 54.6; 525/332.3, 340, 343, 355

[56] References Cited

U.S. PATENT DOCUMENTS

| | | | |
|---|---|---|---|
| 3,933,656 | 1/1976 | Reick | 252/25 |
| 4,051,050 | 9/1977 | Elliott et al. | 252/51.5 |
| 4,098,710 | 7/1978 | Elliott et al. | 252/51.5 |
| 4,194,984 | 3/1980 | Elliott et al. | 252/51.5 |
| 4,224,173 | 9/1980 | Reick | 252/52 |
| 4,284,518 | 8/1981 | Reick | 252/16 |
| 4,973,413 | 11/1990 | DeRosa et al. | 252/51.5 |
| 5,066,412 | 11/1991 | Migdal et al. | 252/54.6 |

*Primary Examiner*—Ellen McAvoy
*Attorney, Agent, or Firm*—Robert A. Kulason; James J. O'Loughlin; Henry H. Gibson

[57] ABSTRACT

Ethylene/α-olefin polymers grafted with perfluoro-substituted, ethylenically-unsaturated epoxides and then reacted with perfluoro-substituted nucleophiles, provide enhanced wear resistance to lubricating oils.

8 Claims, No Drawings

5,141,661

WEAR RESISTANT LUBRICANT ADDITIVES MADE OF ETHYLENE/α-OLEFIN POLYMER GRAFTED WITH PERFLUORO-SUBSTITUENTS

BACKGROUND OF THE INVENTION

1. Field of the Invention

This invention concerns wear resistant lubricant additives, and more particularly to ethylene/α-olefin polymer grafted with perfluoro-substituted, ethylenically-unsaturated epoxides and reacted with perfluoro-substituted nucleophiles, which give enhanced wear resistance to lubricating oils.

2. Description of Background Information

Polytetrafluoroethylene (PTFE) materials, such as oligomeric waxes or oils of PTFE, have been used as anti-wear additives to lubricating oils. These and other wear resistant additives are designed to reduce friction and reduce wear of lubricated systems, such as internal combustion engines. This results in less frequent replacement of worn or damaged parts and greater engine, e.g. fuel, efficiency. PTFE dispersions in lubricating oils are, for example, described in U.S. Pat. No. 3,933,656, U.S. Pat. No. 4,051,050, U.S. Pat. No. 4,098,710, U.S. Pat. No. 4,194,984, U.S. Pat. No. 4,224,173 and U.S. Pat. No. 4,284,518.

PTFE oils and waxes are generally not, however, soluble in lubricating oils. As a result, the use of PTFE materials in lubricating oils gives dispersions or suspensions in which the PTFE can settle out of the formulation. This results in greater wear, particularly during start-up operation.

Perfluoroaliphatic alcohols have been grafted, using various techniques, onto olefin polymers as, for example, described in U.S. Pat. No. 4,973,413, U.S. patent application Ser. No. 07/563,599 filed Aug. 6, 1990 and U.S. patent application Ser. No. 07/649,504 filed Feb. 1, 1991. These perfluorooligomeric-substituted polymers are completely soluble in a wide variety of solvents, including lubricating oils. The resulting lubricating oils possess anti-friction properties over a range of temperatures and operating conditions.

Lubricant additives made by reacting polyolefin, epoxy grafting agent and modified 1,3,4-thiadiazoles are described in U.S. patent application Ser. No. 07/576,807 filed Sep. 4, 1990.

SUMMARY OF THE INVENTION

This invention concerns lubricant additives and lubricating oils. The additive is the reaction product of three compounds. One compound is ethylene/α-olefin polymer. Another compound is perfluoro-substituted, ethylenically-unsaturated epoxide. The epoxide grafts onto the polymer to form an epoxy-containing, perfluoro-substituent. A third compound is perfluoro-substituted nucleophile. The nucleophile reacts with the pendant epoxy group on the graft polymer to form added perfluoro-substituent. Lubricating oils comprising an effective lubricating amount of lubricating oil and an effective amount of the additive are also provided.

DETAILED DESCRIPTION OF THE INVENTION

A new class of lubricant additives has been found providing improved wear resistant properties for lubricants.

The ethylene/α-olefin polymer may be any suitable polymer of ethylene, one or more α-olefin and optionally one or more polyene. The α-olefin has at least 3, preferably from 3 to about 10, and most preferably 3 carbon atoms. Typical α-olefins include, among others: propylene; butylene; isobutylene; pentene; octene; and other mono-, di-, tri-, or tetra-alkylene monoolefins. Polyene, i.e. monomer with 2 or more ethylenic unsaturation sites, like dienes or trienes, may be any non-conjugated diene or triene and can be used as co- or termonomer. Dienes typically have from about 5 to about 14 carbon atoms. Trienes have at least 2 non-conjugated double bonds, and typically up to about 30 carbon atoms. The polyene may have a vinyl group and may be cyclic or bicyclic. Illustrative dienes include, among others, one or more of the following: 1,4-hexadiene; 1,4-cyclohexadiene; dicyclopentadiene; 5-ethylidene-2-norbornene; 5-methylene-2-nonbornene; 1,5-heptadiene; 1,6-octadiene; and other suitable dienes. Illustrative trienes include, among others, one or more of the following: 1-isopropylidene-3a,4,7,7a-tetrahydroindene; 1-isopropylidenedicyclopentadiene; dehydrosodicyclopentadiene; 2-(2-methylene-4-methyl-3-pentenyl)-[2.2.1] bicyclo-5-heptene; and other suitable trienes.

The relative proportion of monomers in the polymer may be any suitable amount. The polymer typically comprises: from about 15 to about 80, preferably from about 40 to about 60, mole percent ethylene; from about 20 to about 85, preferably from about 40 to about 60, mole percent α-olefin; and from 0, or when present from 0.1, to about 15, preferably from about 0 to about 5, mole percent polyene. The polymer may be a copolymer or terpolymer. The polymer may contain minor amounts, generally less than about 30 mole percent of other olefinic or nonolefinic monomers, so long as the basic polymer characteristics are not materially changed. The molecular weight distribution of the polymer is preferably narrow, and may be characterized by a polydispersity index, i.e. a ratio of weight average molecular weight to number average molecular weight, of typically less than 15, preferably from about 1.5 to about 10, and most preferably from about 2 to about 2.5.

The ethylene/α-olefin polymer is generally a substantially linear and rubbery material. Typically, the polymer has a number average molecular weight ($MW_n$) of from about 5,000 to about 1,000,000, preferably from about 20,000 to about 250,000, and most preferably from about 50,000 to about 150,000.

Polymer repeating units can be represented by Formula 1.

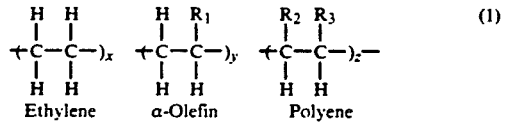

$$\underset{\text{Ethylene}}{+(\underset{H}{\overset{H}{\underset{|}{\overset{|}{C}}}}-\underset{H}{\overset{H}{\underset{|}{\overset{|}{C}}}})_x} \quad \underset{\alpha\text{-Olefin}}{+(\underset{H}{\overset{H}{\underset{|}{\overset{|}{C}}}}-\underset{H}{\overset{R_1}{\underset{|}{\overset{|}{C}}}})_y} \quad \underset{\text{Polyene}}{+(\underset{H}{\overset{R_2}{\underset{|}{\overset{|}{C}}}}-\underset{H}{\overset{R_3}{\underset{|}{\overset{|}{C}}}})_z-} \qquad (1)$$

The variables in Formula 1 have the following meanings. $R_1$, representing the hydrocarbyl substituent in the α-olefin repeating unit, is a straight or branched chain, cyclic or acyclic and preferably having up to about 8 carbon atoms. $R_2$ is hydrogen or combined with $R_3$ to form a cyclic structure containing non-conjugated ethylenic unsaturation. $R_3$ is a hydrocarbyl group having non-conjugated ethylenic unsaturation, and may be combined with $R_2$ has described previously. The number of ethylene repeating units, defined by x, is one or more per repeating segment, providing a total mole percent of ethylene as described previously. The number of α-olefin repeating units, defined by y, is one or more per repeating segment, providing a total mole percent of α-olefin as described previously. The number of polyene repeating units, defined by z, is one or more per repeating segment, providing from zero, when no polyene is present, up to a total mole percent of polyene as described previously. The ethylene, α-olefin and polyene repeating units may be, and are preferably, distributed in a random manner or in blocks, throughout the polymer molecule. Two or more monomers with differing reactivities can be randomly copolymerized by varying either or both the initial monomer proportions or temperature, following established procedures.

The ethylene/α-olefin polymer may optionally be grafted with one or more grafting compounds including, among others, carboxy saturated-hydrocarbyl ester of a carboxylic acid containing an ethylenically unsaturated, carbon-carbon double bond.

Suitable ethylene/α-olefin polymers include, among others, one or more of the following. Typical copolymers of ethylene and propylene are: EPSYN® from Copolymer Rubber and Chemical Corp., made from 60 mole percent ethylene and 40 mole percent propylene and having a $MW_n$ of 140,000 and a polydispersity index of 1.6; EPCAR® 505 from B.F. Goodrich Co., made from 50 mole percent ethylene and 50 mole percent propylene and having a $MW_n$ of 25,000 and a polydispersity index of 2.5; and ESPRENE® from Sumitomo Chemical Co., made from 55 mole percent ethylene and 45 mole percent propylene and having a $MW_n$ of 25,000 and a polydispersity index of 2.5. Typical terpolymers of ethylene, propylene and polyene are: EPSYN® 4006 from Copolymer Rubber and Chemical Corp., made from 58 mole percent ethylene, 40 mole percent propylene and 2 mole percent ethylidene norbornene and having a $MW_n$ of 120,000 and a polydispersity index of 2.2; ORTHOLEUM® 5655 from E.I. duPont deNemours and Company Inc., made from 62 mole percent ethylene, 36 mole percent propylene and 2 mole percent 1,4-hexadiene and having a $MW_n$ of 75,000 and a polydispersity index of 2; ORTHOLEUM® 2052 from E.I. dePont deNemours and Company Inc., made from 62 mole percent ethylene, 36 mole percent propylene and 2 mole percent 1,4-hexadiene and having a $MW_n$ of 35,000 and a polydispersity index of 2; ROYALENE® from UniRoyal, made from 60 mole percent ethylene, 37 mole percent propylene and 3 mole percent dicyclopentadiene and having a $MW_n$ of 100,000 and a polydispersity index of 2.5; and EPSYN® 40A from Copolymer Rubber and Chemical Corp., made from 60 mole percent ethylene, 37 mole percent propylene and 3 mole percent ethylidene norbornene and having a $MW_n$ of 140,000 and a polydispersity index of 2.

Preferred polymers include, among others, those from E.I. duPont deNemours and Company, Inc. under the names ORTHOLEUM® 2052 and PL-1256, which are terpolymers containing 48 mole percent ethylene, 48 mole percent propylene and 4 mole percent 1,4-hexadiene repeating units, with overall inherent viscosities of 1.35 and 1.95, and viscosity average molecular weights of about 200,000 amu and 280,000 amu, respectively.

Perfluoro-substituted, ethylenically unsaturated epoxide can be any suitable compound having: an epoxy group; perfluoro substitution, i.e. fluorocarbyl substituent(s); and ethylenic unsaturation, i.e. a —C═C— group. The epoxide can be represented by Formula 2.

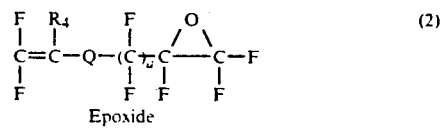

Epoxide

The variables in Formula 2 have the following meanings. Q may be either a single bond or, when present as a substituent, a divalent connecting radical, preferably perfluorocarbylene, like perfluoromethylene. Typically, Q is a carboxyl group. $R_4$ is hydrogen, fluorine or perfluoromethyl. The number of perfluoromethylene repeating units, given by a, is an integer greater than or equal to 1, preferably from 1 to about 10, and most preferably 1. Preferred epoxides include, among others: perfluoroglycidyl (meth)acrylates, such as perfluoroglycidyl methacrylate; and other perfluoro-substituted, ethylenically-unsaturated epoxides.

A wide range of perfluoro-substituted nucleophiles can be used to undergo nucleophilic addition exclusively to the pendant, perfluoro-substituted epoxide. Illustrative nucleophilic groups include, among others, one or more of the following: hydroxy, such as alcohols or phenols; mercaptan; (thio)carboxylic acids or salts; phosphorus-containing acids or salts; and other electronegative groups. The nucleophile can be represented by Formula 3.

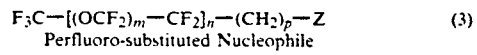

Perfluoro-substituted Nucleophile

In Formula 3, the average number of perfluoro-containing repeating units, given by n is greater than 1, preferably from 2 to about 100, and most preferably from about 6 to about 15. The variable m is 0 or 1 and gives perfluoropolyether when m is 1. The number of methylene repeating units, given by p, may be from 0 up to about 10, and preferably from 0 to about 2. The functional group Z may be any group which reacts with epoxy as described previously. Preferably Z is hydroxy, phosphate, carboxylic acid or thiocarboxylate. Typical nucleophiles include, among others, one or more of the following: perfluoroaliphatic alcohol; perfluoroaliphatic phosphate; perfluoroaliphatic thiocarboxylate, e.g. lithium salt; perfluoropolyether carboxylic acid; and other perfluoroaliphatic or perfluoropolyether compounds.

The relative proportions of polymer, epoxide and nucleophile may be any suitable amount. Typically, the relative proportion of epoxide to polymer will range from about 0.1 to about 10, preferably from about 0.5 to about 2, weight percent. The relative proportion of nucleophile to polymer will typically range from about 0.1 to about 10, preferably from about 0.5 to about 2, weight percent, and especially sufficient nucleophile to react with all the pendant epoxides.

The reaction between the polymer and epoxide may be any procedure suitable for grafting the epoxide onto the polymer backbone. In one embodiment, "ene" reaction chemistry is used in which epoxide, acting as an enophile through the presence of ethylenic unsaturation, undergoes an allylic shift with a hydrogen from the polymer to graft the epoxide onto the polymer backbone. Alternatively, a free radical initiator can be used to add the epoxide to the polymer. The grafting reaction is illustrated in Equation 4.

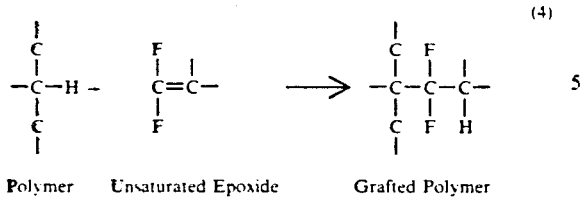

Polymer    Unsaturated Epoxide    Grafted Polymer    (4)

In Formula 4, partial structural representations of the compounds show how the ethylenic unsaturation of the epoxide reacts with the backbone of the polymer to graft, i.e. bond, the ethylenically-unsaturated epoxide to the polymer.

The grafting reaction can be conducted under using any suitable reaction conditions and materials. Typical temperatures may range from about 100° C. to about 250° C., preferably from about 120° C. to about 190° C., and most preferably from about 150° C. to about 180° C. The reaction may be conducted with or without solvent. If solvent is used, any suitable solvent, i.e. which is inert to the reaction, may be provided such as hydrocarbons like benzene, heptane, cyclohexane, mineral oil, and the like. If free radical initiators are used, typical initiators include, among others, one or more of the following: peroxides; hydroperoxides; and azo compounds; especially compounds which have a boiling point greater than 100° C. and thermally decompose within the grafting temperature range to ensure an adequate supply of free radicals. Typical free radical initiators include, among others: azobutyronitrile; 2,5-dimethyl-hex-3-yene-2,5-bis-t-butylperoxide; and other initiators. The amount of initiator typically ranges from between 0.005 to about 2 weight percent, based on the weight of the reaction mixture. To avoid oxidative degradation of the polymer, grafting is generally performed under an inert atmosphere. The grafting may be performed in an enclosed vessel under moderate to high pressure, especially if any component is particularly volatile. The reaction may also be performed in the absence of solvent and at elevated pressures in order to trap volatile components. The reactants may be mixed using any suitable procedure, such as extrusion or mastication. One or more extrusion passes may be performed to ensure high grafting levels. Any suitable apparatus may be used, such as single or twin screw extruders. Typical extrusion temperatures range from about 150° C. to about 400° C.

The grafted polymer is reacted with the nucleophile, such as shown in Formula 5, under any suitable conditions for reacting epoxy groups with nucleophilic compounds, including as described previously for the grafting reaction. The nucleophile reacts essentially exclusively with the pendant epoxy group forming added perfluoro-substituent.

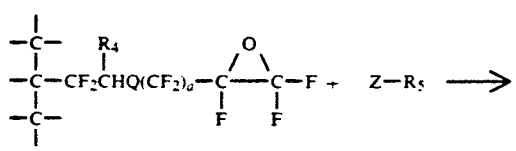

Grafted Polyolefin    Nucleophile    (5)

-continued

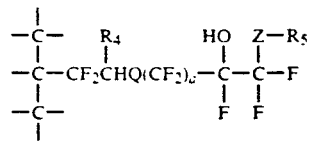

Product

In Formula 5, $R_5$ is the rest of the nucleophile which contains functional group Z as described previously. The other variables in Formula 5 are as defined previously.

Any suitable, including known, lubricating oils can be used in the lubricating oil composition. Typical lubricating oils include, among others, one or more of the following: natural oils or distillates, such as derived from paraffinic, naphthenic, asphaltic, or mixed base crudes or other liquid petroleum oils; refined or treated oils such as by deasphalting, dewaxing, hydrogenation, treating with acid, alkyl, clay or other agents as well as extraction, such as using solvents; hydrogenated oils; white oils; shale oil; synthetic oils such as made by polymerization, oligomerization, alkylation, or other means; animal or vegetable oils; or other lubricating oil.

Any effective amount of lubricant additive can be used in the lubricating oil composition. Typically, from about 0.1 to about 30, preferably from about 1 to about 15, weight percent of additive is provided based on the total weight of the composition. Oil concentrates of the additive containing from about 1 up to about 50 or more weight percent of the additive can be provided.

The lubricating oil composition can contain other, including known, additives, in any suitable amount, including one or more of the following: dispersants; detergents; anti-oxidants; pour point depressants; viscosity index improvers; other anti-wear agents; or other lubricant additives.

Lubricating oil compositions may be prepared using any suitable, including known, technique, such as blending the lubricating oil, wear-resistant additive of this invention, and other optional ingredients.

The following examples present illustrative embodiments of this invention without intention to limit its scope. All percentages given in the disclosure and claims are in weight percent, unless otherwise stated.

EXAMPLES

Designations used in the examples have the following meanings:

| Designation | Description |
| --- | --- |
| Epoxide | Perfluoroglycidyl methacrylate, called ZONYL TM TE from E. I. duPont deNemours and Company Inc. |
| Nucleophile 1 | Perfluoroaliphatic alcohol having about 9.0 perfluoroaliphatic repeat units, called ZONYL TM BA from E. I. duPont deNemours and Company Inc. |
| Nucleophile 2 | Perfluoroaliphatic phosphate having about 6.8 perfluoroaliphatic repeat units, called ZONYL TM UR from E. I. duPont deNemours and Company Inc. |
| Nucleophile 3 | Perfluoroaliphatic thiocarboxylic acid having about 8.9 lithium salt of perfluoroaliphatic repeat units, called ZONYL TM FSA from E. I. duPont deNemours and Company Inc. |
| Nucleophile 4 | Perfluoropolyether carboxylic acid having |

-continued

| Designation | Description |
|---|---|
| | about 8.3 perfluoropolyether repeat units, called KRYTOX ™ 157FS(M) from E. I. duPont deNemours and Company Inc. |
| Nucleophile 5 | Perfluoropolyether carboxylic acid having about 14.7 perfluoropolyether repeat units, called KRYTOX ™ 157FS(L) from E. I. duPont deNemours and Company Inc. |
| Polymer 1 | Ethylene/α-olefin polymer having about 60 mole percent ethylene and about 40 mole percent propylene and a number average molecular weight of about 80,000, called EPSYN ® from Copolymer Rubber and Chemical Corp. |
| Perfluoro-aliphatic | Polymer 1 grafted with 0.5-1 weight percent TELOMER ™ B from E. I. duPont deNemours and Company Inc. |
| Fluoroalipathic compound called Graft Polymer | |

EXAMPLE 1

GRAFTING REACTION 200 g. of Polymer 1 are dissolved in 1440 g. of a neutral oil, called SNO 100 from Texaco Inc., as solvent, at 160° C. using a mechanical stirrer under nitrogen atmosphere. The mixture is then heated an additional hour at 160° C. 17 g. of Epoxide are added neat to the polymeric oil solution along with 2.5 g. of dicumyl peroxide, as free radical initiator, dissolved in 10 g. of the oil solvent. The reaction is continued for 2.5 hours at 160° C. and the product is then filtered using a 200 mesh screen.

EXAMPLES 2-6

NUCLEOPHILIC REACTION

These examples describe the reaction of various nucleophiles with the graft polymer produced in Example 1. In Example 2, 26 g. of the graft polymer produced in Example 1 are dissolved in 174 g. of the neutral oil solvent as used in Example 1, at 160° C. using mechanical stirring under nitrogen atmosphere. Nucleophile 1 (3.4 g.) is added neat to the solution and the reaction heated for one hour at 160° C. The mixture is then cooled to 120° C. and filtered through a 200 mesh screen. In Example 3, the procedure in Example 2 is followed using 9.8 g. of Nucleophile 2 instead of Nucleophile 1. In Example 4, the procedure in Example 2 is followed using 8.9 g. of Nucleophile 3 instead of Nucleophile 1. In Example 5, the procedure in Example 2 is followed using 6.2 g. of Nucleophile 4 instead of Nucleophile 1. In Example 6, the procedure in Example 2 is followed using 13.7 g. of Nucleophile 5 instead of Nucleophile 1.

EXAMPLE 7

PRODUCT EVALUATION

Anti-wear properties of the products made in Examples 2-6 are evaluated using the Four Ball Wear Test, ASTM Test No. MS82-79, using lubricating oil compositions as follows: 83.5 weight percent solvent neutral oil having a specific gravity at 60/60° F. of 0.858-0.868, a viscosity at 11° F. of 123-133 centipoise, and a pour point of 0° F.; 5 weight percent solvent neutral oil having a specific gravity at 60/60° F. of 0.871-0.88, a viscosity at 100° F. of 325-350 centipoise, and a pour point of 10° F.; and 11.5 weight percent polymer as set forth in Table 1. The test conditions comprise heating the oil to 167° F. for one hour using a speed rotation of 600 rpm and a load of 40 kg. The results, given in millimeters of average scar diameter, are set forth in Table 1. Reference oil samples containing unmodified ethylene/α-olefin polymer, ethylene/α-olefin polymer grafted with perfluoroaliphatic alcohol, and graft polymer produced in Example 1 are also listed for comparison.

TABLE 1

| FOUR BALL WEAR TEST RESULTS | |
|---|---|
| Polymeric Component | Average Scar Diameter (mm) |
| Polymer 1 (unmodified) | 0.83 |
| Graft Polymer of Example 1 | 0.67 |
| Product of Example 2 | 0.34 |
| Product of Example 3 | 0.41 |
| Product of Example 4 | 0.35 |
| Product of Example 5 | 0.44 |
| Perfluoroaliphatic Graft Polymer | 0.60 |

The results in Table 1 show that enhanced wear resistance is obtained by the combination of perfluoro-substituted nucleophile reacted with perfluoro-substituted epoxides grafted onto ethylene/α-olefin polymers.

We claim:

1. A lubricant additive comprising the product of reacting, generally at a temperature ranging from about 100° C. to about 400° C.:
   (a) ethylene/α-olefin polymer; with
   (b) perfluoro-substituted, ethylenically-unsaturated epoxide which grafts onto the polymer to form an epoxy-containing, perfluoro-grafter polymer; and with
   (c) perfluoro-substituted nucleophile which reacts with the pendant epoxy group on the graft polymer to form additionally perfluoro-substituted, graft polymer;

wherein the proportions of epoxide and nucleophile to polymer generally range from about 0.1 to about 10 weight percent.

2. The additive of claim 1 wherein the polymer comprises from about 15 to about 80 mole percent ethylene, from about 20 to about 85 mole percent of α-olefin having from 3 to about 10 carbon atoms, and from 0 to about 15 mole percent of polyene which is a non-conjugated diene or triene, which polymer has a number average molecular weight of from about 5,000 to about 500,000.

3. The additive of claim 1 wherein the epoxide is perfluoroglycidyl methacrylate.

4. The additive of claim 1 wherein the nucleophile is perfluoraliphatic or perfluoropolyether alcohol, phosphate, carboxylic or thiocarboxylic acid or salt.

5. A lubricating oil composition comprising an effective lubricating amount of lubricating oil and an effective amount of additive comprising the product of reacting, generally at a temperature ranging from about 100° C. to about 400° C.:
   (a) ethylene/α-olefin polymer; with
   (b) perfluoro-substituted, ethylenically-unsaturated epoxide which grafts onto the polymer to form an epoxy-containing, perfluoro-grafted polymer; and with
   (c) perfluoro-substituted nucleophile which reacts with the pendant epoxy group on the graft polymer to form additionally perfluoro-substituted, graft polymer;

wherein the proportions of epoxide and nucleophile to polymer generally range from about 0.1 to about 10 weight percent.

6. The composition of claim 5 wherein the polymer comprises from about 15 to about 80 mole percent ethylene, from about 20 to about 85 mole percent of α-olefin having from 3 to about 10 carbon atoms, and from 0 to about 15 mole percent of polyene which is a non-conjugated diene or triene, which polymer has a number average molecular weight of from about 5,000 to about 500,000.

7. The composition of claim 5 wherein the epoxide is perfluoroglycidyl methacrylate.

8. The composition of claim 5 wherein the nucleophile is perfluoroaliphatic or perfluoropolyether alcohol, phosphate, carboxylic or thiocarboxylic acid or salt.

* * * * *